United States Patent
Liu et al.

(10) Patent No.: US 9,813,282 B2
(45) Date of Patent: Nov. 7, 2017

(54) SAMPLING PHASE DIFFERENCE COMPENSATION APPARATUS AND METHOD, AND COMMUNICATION DEVICE CAPABLE OF COMPENSATING SAMPLING PHASE DIFFERENCE

(71) Applicant: MStar Semiconductor, Inc., Hsinchu Hsien (TW)

(72) Inventors: Po-Hung Liu, Zhubei (TW); Tzu-Yi Yang, Zhubei (TW); Teng-Han Tsai, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/175,121

(22) Filed: Jun. 7, 2016

(65) Prior Publication Data

US 2016/0365971 A1 Dec. 15, 2016

(30) Foreign Application Priority Data

Jun. 10, 2015 (TW) .............................. 104118739 A (51) Int. Cl.
*H04L 7/00* (2006.01)
*H04L 27/38* (2006.01)

(52) U.S. Cl.
CPC ................................ *H04L 27/3863* (2013.01)

(58) Field of Classification Search
CPC ..... H04L 7/033; H04L 7/0337; H04L 7/0814; H04L 7/0338; H04L 7/0008; H04L 7/02; H04L 7/0331; H04L 27/2647; H04L 1/20; H04L 1/0003; H04L 1/0071;
(Continued)

(56) References Cited

U.S. PATENT DOCUMENTS

2012/0213266 A1* 8/2012 Su ....................... H04B 17/0062
375/226
2016/0056903 A1* 2/2016 Wang ...................... H04L 25/06
375/219

FOREIGN PATENT DOCUMENTS

TW 201301818 A1 1/2013

OTHER PUBLICATIONS

TIPO Office Action, dated Aug. 9, 2016, 14 pages.

\* cited by examiner

*Primary Examiner* — Zewdu Kassa
(74) *Attorney, Agent, or Firm* — Edell, Shapiro & Finnan, LLC (57) ABSTRACT

A sampling phase difference compensation apparatus includes a signal generator, a signal analyzer and a compensator. The signal generator generates a first signal and a second signal, and outputs the first and second signals to a first path in a first time interval and a second path in a second time interval, respectively. The signal analyzer receives a transmitted first signal from the first path and a transmitted second signal from the second path, and performs a predetermined calculation on the transmitted first and second signals to determine a phase difference relationship, which is associated with a frequency-dependent phase difference and a sampling phase difference, between the transmitted first and second signals. The transmitted first signal is associated with the first signal, and the transmitted second signal is associated with the second signal. The compensator performs a phase difference compensation according to the phase difference relationship.

19 Claims, 7 Drawing Sheets

(58) Field of Classification Search
CPC ....... H03L 7/0814; G06F 1/10; H04N 5/4401;
H04B 1/30; H04B 1/28
USPC ........................ 375/371, 354, 295, 316, 219
See application file for complete search history.

SAMPLING PHASE DIFFERENCE COMPENSATION APPARATUS AND METHOD, AND COMMUNICATION DEVICE CAPABLE OF COMPENSATING SAMPLING PHASE DIFFERENCE

This application claims the benefit of Taiwan application Serial No. 104118739, filed Jun. 10, 2015, the subject matter of which is incorporated herein by reference.

BACKGROUND OF THE INVENTION

Field of the Invention

The invention relates in general to phase difference compensation, and more particularly, to sampling phase difference compensation.

Description of the Related Art

Figure 1:
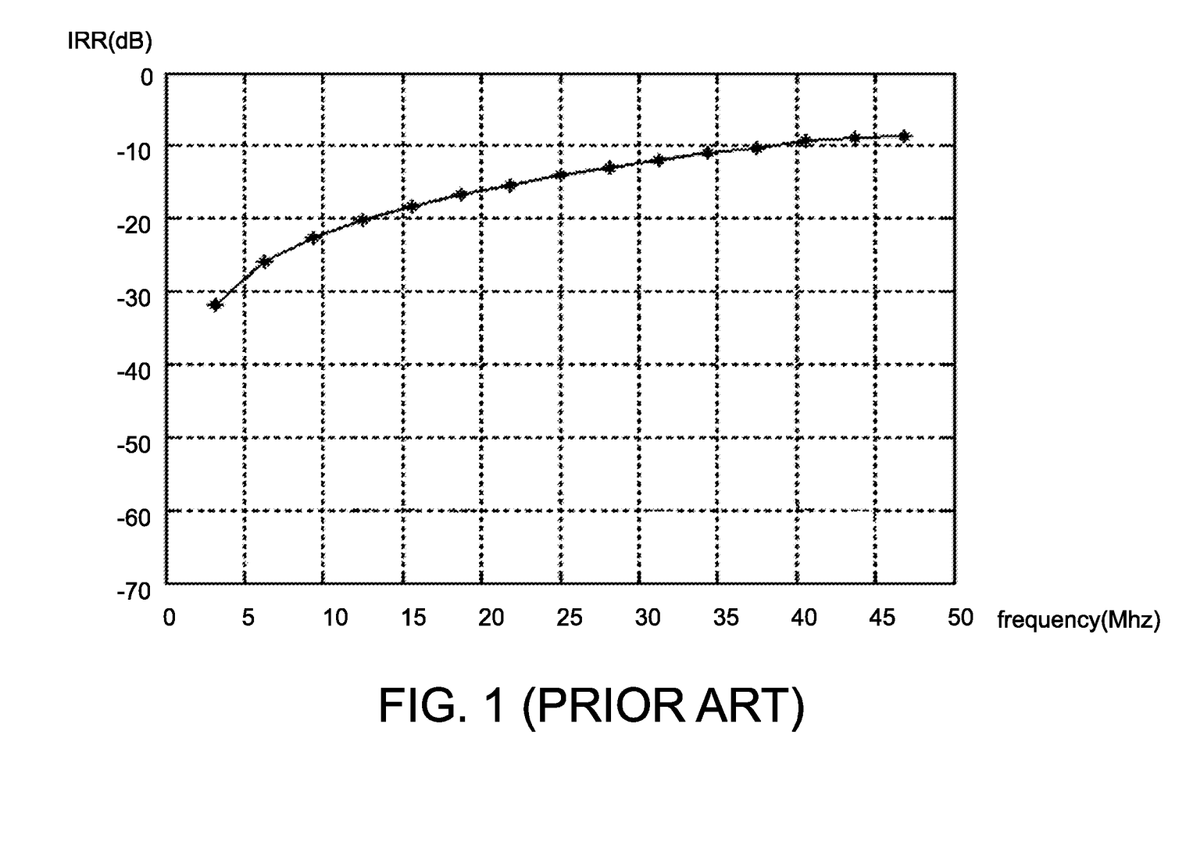
FIG. 1 is a schematic diagram of a image rejection ratio (IRR) curve of the prior art.

Communication technologies (e.g., orthogonal frequency division multiplexing (OFDM)) adopting in-phase and quadrature-phase modulation methods frequently encounter IQ mismatch (or IQ imbalance), which has a particularly great effect on circuits using a zero intermediate frequency (ZIF) structure. To solve IQ mismatch, currently known technologies detect and compensate mismatch associated with frequency and mismatch unassociated with frequency. The mismatch associated with frequency is caused by a low-pass filter (LPF) in a transmission path of in-phase signals and an LPF in a transmission path of quadrature-phase signals, and the mismatch unassociated with frequency is caused by a modulator in a transmission path of in-phase signals and a modulator in a transmission path of quadrature-phase signals. For example, the compensation result is reflected by an image rejection ratio (IRR). Referring to FIG. 1 showing an IRR curve obtained by currently known technologies, the IRR curve changes with time and displays a linear relationship. The definition of the above IRR curve is generally known to one person skilled in the art. Discovered from the IRR curve in FIG. 1, currently known technologies need yet to improve.

SUMMARY OF THE INVENTION

The invention is directed to a sampling phase difference compensation apparatus, a sampling phase difference compensation method and a communication device capable of compensating a sampling phase difference.

The present invention discloses a sampling phase difference compensation apparatus. According to an embodiment of the present invention, the sampling phase difference compensation apparatus includes a signal generator, a signal analyzer and a compensator. The signal generator generates a first signal and a second signal, outputs the first signal to a first path in a first time interval, and outputs the second signal to a second path in a second time interval. The first and second time intervals are different, and the first and second paths are different. The signal analyzer receives a transmitted first signal from the first path and a transmitted second signal from the second path, and performs a predetermined calculation on the transmitted first and second signals to determine a phase difference relationship between the transmitted first and second signals. The phase difference relationship is associated with a frequency-dependent phase difference and a sampling phase difference. The transmitted first signal is associated with the first signal, and the transmitted second signal is associated with the second signal. The compensator performs a phase difference compensation according to the phase difference relationship.

The present invention further discloses a sampling phase difference compensation method. According to the an embodiment of the present invention, the sampling phase difference compensation method includes steps of: generating a first signal and a second signal; outputting the first signal to a first path in a first time interval; outputting the second signal to a second path in a second time interval, wherein the first and second time intervals are different, and the first and second paths are different; receiving a transmitted first signal from the first path and a transmitted second signal from the second path in the first and second time intervals, respectively, and performing a predetermined calculation on the transmitted first and second signals to determine a phase difference relationship between the transmitted first and second signals, wherein the phase difference relationship is associated with a frequency-dependent phase difference and a sampling phase difference, the transmitted first signal is associated with the first signal, and the transmitted second signal is associated with the second signal; and performing a phase difference compensation according to the phase difference relationship.

The present invention further discloses a communication device capable of compensating a sampling phase difference. According to an embodiment of the present invention, the communication device includes: a signal generator, outputting a first signal in a first time interval and outputting a second signal in a second time interval, wherein the first and second time intervals are different; a first digital-to-analog converter (DAC), coupled to the signal generator, performing a digital-to-analog conversion on the first signal to generate an analog first signal; a first transmission filter, coupled to the first DAC, filtering the analog first signal to generate a filtered first signal; a second DAC, coupled to the signal generator, performing the digital-to-analog conversion on the second signal to generate an analog second signal; a second transmission filter, coupled to the second DAC, filtering the analog second signal to generate a filtered second signal; a multiplexer, coupled to the first and second transmission filters, outputting the filtered first and second signals; a first reception filter, coupled to the multiplexer, filtering the filtered first signal to generate a re-filtered first signal and filtering the filtered second signal to generate a re-filtered second signal; a first analog-to-digital converter (ADC), coupled to the first reception filter, performing an analog-to-digital conversion on the re-filtered first signal to generate a transmitted first signal, and performing the analog-to-digital conversion on the re-filtered second signal to generate a transmitted second signal; and a receiver digital front-end circuit, comprising: a signal analyzer, coupled to the first ADC, performing a predetermined calculation on the transmitted first and second signals to determine a phase difference relationship between the transmitted first and second signals, wherein the phase difference relationship is associated with a frequency-dependent phase difference and a sampling phase difference; and a compensator, performing a phase difference compensation according to the phase difference relationship.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, the definitions of the terms are based on the description or explanation of the application.

In the apparatus and method disclosed by the application, a part of elements included in the apparatus may be individually known elements. Without affecting the full disclosure and possible implementation of the apparatus, details of the known elements are omitted. Individual steps or combinations of multiple steps of the method may be in form of software and/or firmware, and may be performed by the apparatus of the present invention or an equivalent device.

When compensating mismatch associated with internal components of a transceiver and frequency of a communication device, in-phase and quadrature-phase signals used for compensation tests are transmitted via respective paths in different time intervals and are detected to simplify the compensation process. It is discovered by the Applicant that, a sampling phase difference (or referred to as a sampling offset or sampling delay) may exist among detection operations of different time intervals and such sampling phase difference affects the compensation result. For this issue, the present invention provides a compensation apparatus and method capable of linear compensation to eliminate the effect that time differences have on the phase.

Figure 2A:
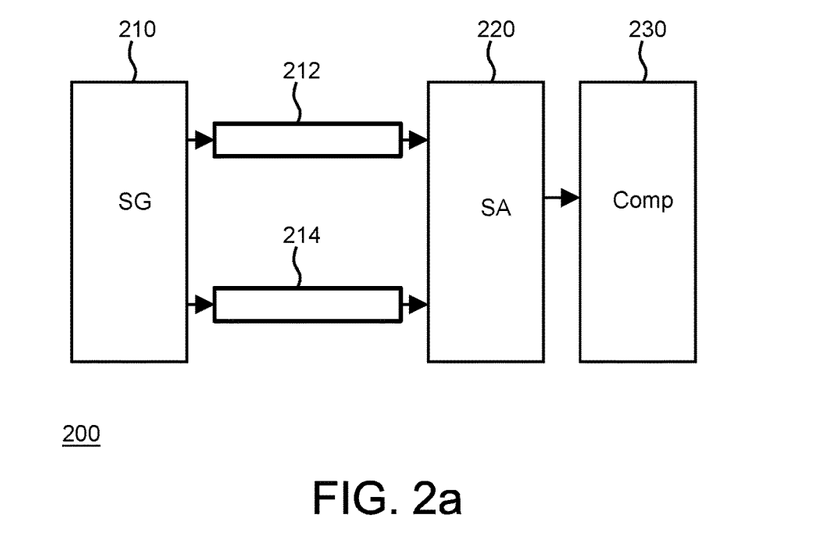
FIG. 2a is a schematic diagram of a sampling phase difference compensation apparatus according to an embodiment of the present invention.
Figure 2B:
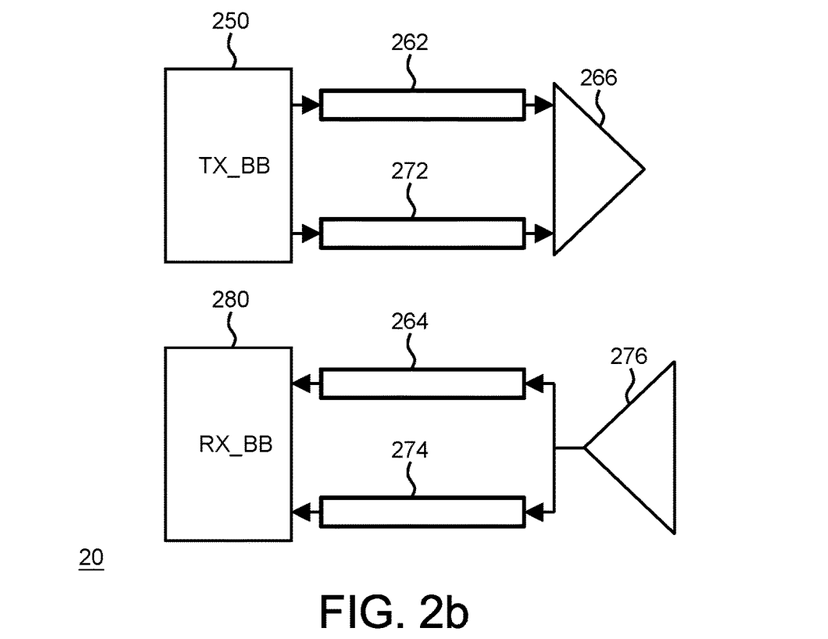
FIG. 2b is a schematic diagram of a circuit applicable to FIG. 2a to normally transceive signals.

Referring to FIG. 2a and FIG. 2b, FIG. 2a shows a schematic diagram of a sampling phase difference compensation apparatus 200 according to an embodiment of the present invention, and FIG. 2b shows a schematic diagram of a circuit structure for normally transceiving signals. As shown in FIG. 2a, the sampling phase difference compensation apparatus 200 includes: a signal generator (denoted as SG in the diagram), outputting a first signal to a first path 212 and outputting a second signal to a second path 214; a signal analyzer (denoted as SA in the diagram) 220; and a compensator (denoted as Comp in the diagram) 230. A circuit 20 in FIG. 2b includes a signal providing circuit (e.g., a transmitter baseband circuit) (denoted as TX_BB in the diagram) 250, a first transmission path 262, a first reception path 264, an output end (e.g., a combination of an adder and a power amplifier), a second transmission path 272, a second reception path 274, an input end (e.g., a low noise amplifier (LNA)) 276, and a signal processing circuit (e.g., a receiver baseband circuit) (denoted as RX_BB in the diagram) 280. The first and second transmission paths 262 and 272 have similar structures, and each includes a digital-to-analog converter (DAC), a filter and a modulation circuit. The first and second reception paths 264 and 274 have similar structures, and each includes a modulation circuit, a filter and an analog-to-digital converter (ADC). When signals are transceived in normal conditions, the circuit in FIG. 2b may exclude or include but need not to use an optional test signal generator (e.g., the signal generator 210 in FIG. 2a), a test signal transmission multiplexer (e.g., a multiplexer 340 in FIG. 3), a test signal analyzer (e.g., the signal analyzer 220 in FIG. 2a), and a test signal compensator (e.g., the compensator 230 in FIG. 2a). If the circuit in FIG. 2a is to normally transceive signals as the one in FIG. 2b, it would include all circuits in FIG. 2b, and the first path 212 in FIG. 2a includes the first transmission path 262 and the first reception path 264 in FIG. 2b, and the second path 214 in FIG. 2a includes the second transmission path 272 and the second reception path 274 in FIG. 2b.

Again referring to FIG. 2a, the signal generator 210 outputs a first signal to the first path 212 in a first time interval, and outputs a second signal to the second path 214 in a second time interval. The first and second time intervals are different to simplify the phase difference compensation mechanism, and the first path 212 is different from the second path 214. For example, the first and second signals are respectively an in-phase signal $$S_{TXI}(t) = \sum_{i=1}^{N/2-1} \cos(\omega_i t)$$

and a quadrature-phase signal $$S_{TXQ}(t) = \sum_{i=1}^{N/2-1} \sin(\omega_i t).$$

An initial phase difference between the two is 90 degrees, wherein t is the time point, $\omega_i$ is the frequency, N is a positive integer, and the value i may be controlled by the signal generator 210 (i.e., the signal generator 210 is capable of controlling the frequencies of the first and second signals). The first and second time intervals are non-overlapping intervals. The first path 212 includes a first transmission path and a first reception path, and the second path 214 includes a second transmission path and the first reception path. Alternatively, the first path 212 and the second path 214 have the same transmission path but different reception paths. The signal analyzer 220 receives a transmitted first signal from the first path 212 and a transmitted signal second signal from the second path 214, and performs a predetermined calculation on the transmitted first and second signals to accordingly determine a phase difference relationship between the transmitted first and second signals. The phase difference relationship is associated with a frequency-dependent phase difference and a sampling phase difference. The transmitted first signal is associated with the first signal, and the transmitted second signal is associated with the second signal. The compensator 230 performs a phase difference compensation according to the phase difference relationship, e.g., to reduce the effect of the sampling phase difference.

Figure 3:
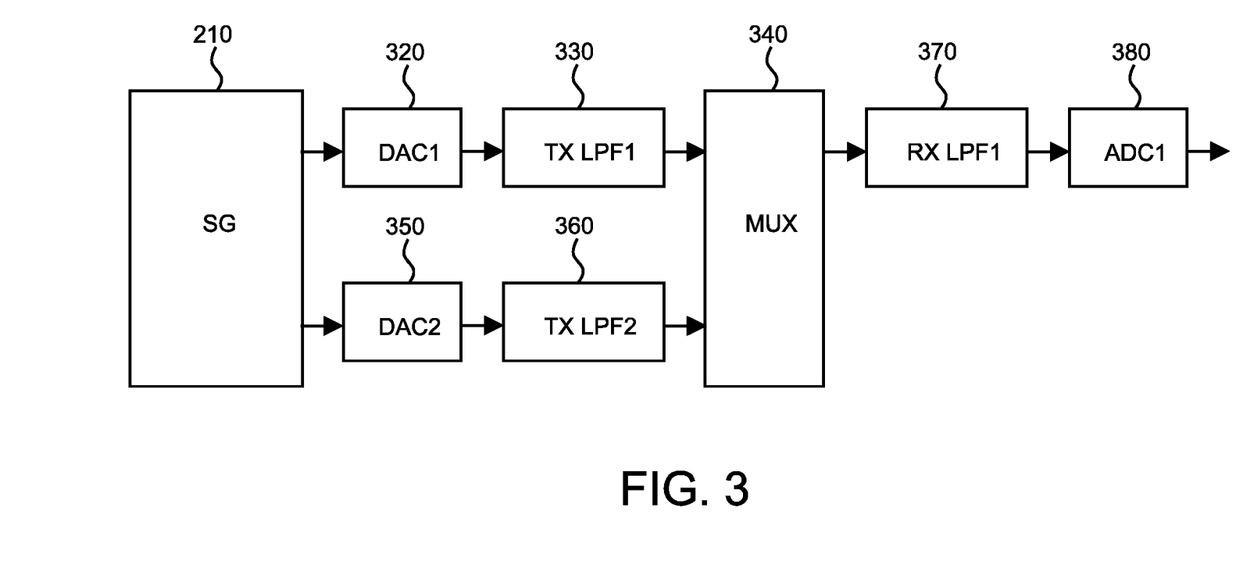
FIG. 3 is a schematic diagram of a first path and a second path in FIG. 2a according to an embodiment of the present invention.

FIG. 3 shows a schematic diagram of the first path 212 and the second path 214 in FIG. 2a according to an embodiment of the present invention. The first path 212 includes a first transmission path and a first reception path, and the second path 214 includes a second transmission path and the first reception path. The first transmission path includes a first DAC (denoted as DAC1 in the diagram) 320, a first transmission filter (denoted as TX LPF1 in the diagram) 330, and a multiplexer (denoted as Mux in the diagram) 340. The second transmission path includes a second DAC (denoted as DAC2 in the diagram) 350, a second transmission filter (denoted as TX LPF2 in the diagram) 360, and the multiplexer 340. The first reception path includes a first reception filter (denoted as RX LPF1 in the diagram) 370 and a first ADC (denoted as ADC1 in the diagram) 380. The elements 320 to 380 may be individually known elements. The first transmission filter 330 and the second transmission 360 are the main causes of the foregoing frequency-dependent phase difference, and the difference in the time points of transmitting the first and second signals is the main cause of the foregoing sampling phase difference.

Referring to FIG. 2a and FIG. 3, when the first and second signals are respectively $$S_{TXI}(t) = \sum_{i=1}^{N/2-1} \cos(\omega_i t)$$

and $$S_{TXQ}(t) = \sum_{i=1}^{N/2-1} \sin(\omega_i t),$$

the first signal transmitted via the first path 212 (i.e., a transmitted first signal $r_{TXI}[n]$ outputted by the first ADC 380) may be represented by equation (1) below:

$$r_{TXI}[n] = \sum_{i=1}^{N/2-1} g_{RXI}(\omega_i)g_{TXI}(\omega_i)\cos(2\pi n i/N + \theta_{TXI}(\omega_i) + \theta_{RXI}(\omega_i)) \quad (1)$$

In equation (1), n corresponds to the sampling point of the first ADC 380, $g_{RXI}(\omega_i)$ is the gain of the first reception path, $g_{TXI}(\omega_i)$ is the gain of the first transmission path, $\theta_{TXI}(\omega_i)$ is the phase of the first transmission path, and $\theta_{RXI}(\omega_i)$ is the phase of the first reception path. The definitions of the remaining parameters are as previously described.

Further, without considering the sampling phase difference between the first and second signals, the second signal transmitted via the second path 214 (i.e., a transmitted second signal $r_{TXQ}[n]$ outputted by the first ADC 380) may be represented by equation (2) below:

$$r_{TXQ}[n] = \sum_{i=1}^{N/2-1} g_{RXI}(\omega_i)g_{TXQ}(\omega_i)\sin(2\pi n i/N + \theta_{TXQ}(\omega_i) + \theta_{RXI}(\omega_i)) \quad (2)$$

In equation (2), $g_{TXQ}(w_i)$ is the gain of the second transmission path, and $\theta_{TXQ}(w_i)$ is the phase of the second transmission path. The definitions of the remaining parameters are as previously described.

However, as the first and second signals are transmitted at different time points, a sampling phase difference inevitably exists between the two. Thus, the second signal transmitted via the second path 214 is in fact $r_{TXQ}[n-n_d]$, where $n_d$ represents an unknown sampling phase difference.

Figure 4:
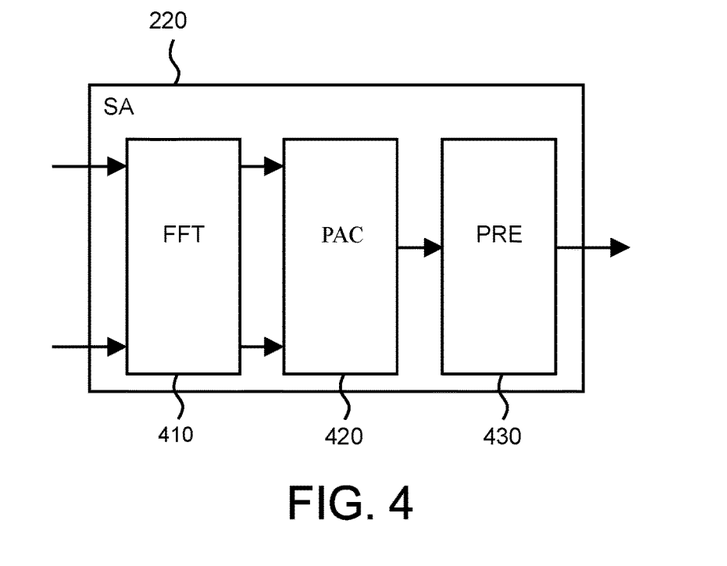
FIG. 4 is a schematic diagram of a signal analyzer in FIG. 2a according to an embodiment of the present invention.

FIG. 4 shows a schematic diagram of the signal analyzer 220 in FIG. 2a according to an embodiment of the present invention. As shown in FIG. 4, the signal analyzer 220 includes: a fast Fourier transform (FFT) unit (denoted as FFT in the diagram) 410, a phase angle calculating unit (denoted as PAC in the diagram) 420, e.g., a dividing unit and an arctangent calculating unit, and a phase change rate calculating unit, and a phase ramp estimating unit (denoted as PRE in the diagram) 430, e.g., a phase change rate calculating unit. Any of the above units may be an independent known element. The FFT unit 410 transforms the first signal $r_{TXI}[n]$ outputted by the first ADC 380 from a time-domain signal to a frequency-domain signal $R_{TXI}[k]$, represented as equation (3) below:

$$R_{TXI}[k] = \frac{N}{2}g_{RXI}(\omega_k)g_{TXI}(\omega_k)e^{j(\theta_{TXI}(\omega_k)+\theta_{RXI}(\omega_k))} \quad (3)$$

where $$1 \leq k \leq N/2 - 1.,$$

The FFT unit 410 transforms the second signal $r_{TXQ}[n-n_d]$ outputted by the first ADC 380 from a time-domain signal to a frequency-domain signal $R_{TXQ}[k]$, as shown in equation (4) below:

$$R_{TXQ}[k] = \frac{N}{2j}g_{RXI}(\omega_k)g_{TXQ}(\omega_k)e^{j(\theta_{TXQ}(\omega_k)+\theta_{RXI}(\omega_k))}e^{-j2\pi n_d k/N} \quad (4)$$

where $$1 \leq k \leq N/2 - 1.,$$

With $R_{TXI}[k]$ and $R_{TXQ}[k]$, the phase angle calculating unit 420 divides $R_{TXI}[k]$ by $R_{TXQ}[k]$ to obtain a mismatch response between the first path 212 and the second path 214, as equation (5) below:

$$\frac{R_{TXI}[k]}{R_{TXQ}[k]} = \frac{g_{TXI}(\omega_k)}{j \cdot g_{TXQ}(\omega_k)}e^{j(\theta_{TXI}(\omega_k)-\theta_{TXQ}(\omega_k))}e^{j2\pi n_d k/N} \quad (5)$$

$$= g_{TXFD}(\omega_k) \cdot e^{j(\theta_{TXFD}(\omega_k)+2\pi n_d k/N)}$$

In equation (5), $\theta_{TXFD}(\omega_k)$ is the frequency-dependent phase difference, and $2\pi n_d k/N$ is the sampling phase difference. The phase angle calculating unit 420 may then perform an arctangent calculation to obtain a sum of the phase differences: $\theta(k)=\theta_{TXFD}(\omega_k)+2\pi n_d k/N$.

If the value k changes as the value i controlled by the signal generator 210 changes (e.g., k is an integer between 1 and N/2−1), the phase ramp estimating unit 430 may estimate a change rate Δθ corresponding to a plurality of sums θ(k) of $\theta_{TXFD}(\omega_k)$ and $2\pi n_d k/N$. For example, the phase ramp estimating unit 430 may obtain an approximate straight line using a least mean square (LMS) method according to the plurality of sums θ(k), and accordingly obtain the slope of the straight line as the change rate Δθ. The sum θ(k) of the frequency-dependent phase difference and the sampling phase difference displays a linear relationship as the frequency changes.

Figure 5:
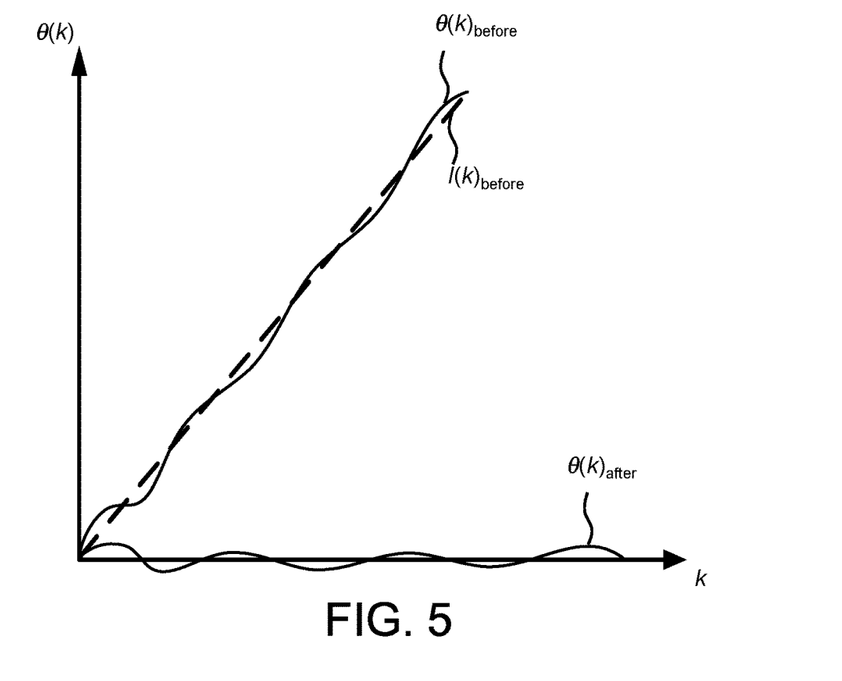
FIG. 5 is a schematic diagram of a phase difference before and after performing the phase difference compensation of the present invention.
Figure 6:
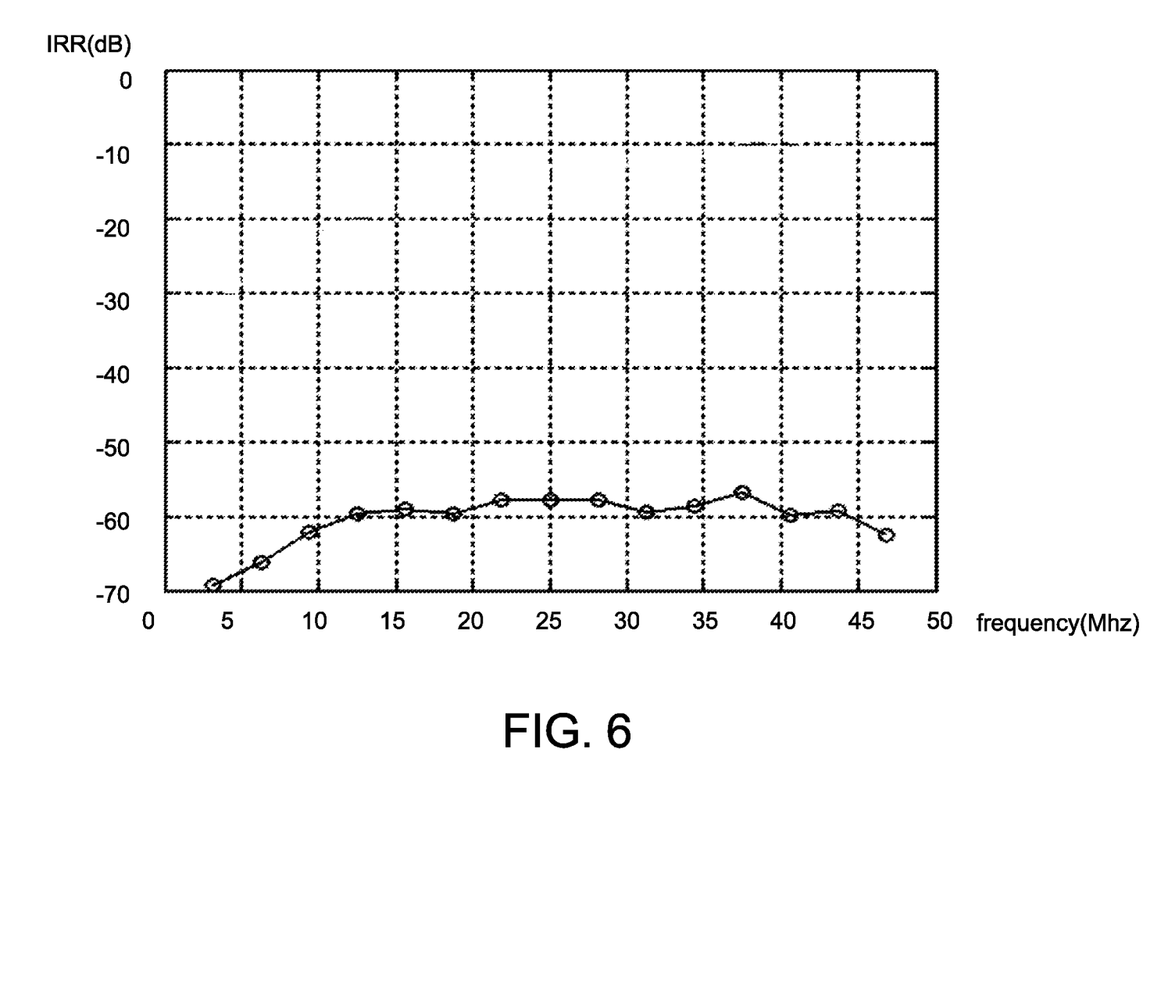
FIG. 6 is a schematic diagram of an IRR curve of the present invention.

After the signal analyzer 220 determines the change rate Δθ corresponding to the sum θ(k) of the frequency-dependent phase difference and the sampling phase difference, the compensator 230 may then compensate the sampling phase difference according to the change rate Δθ. For example, when the analysis result of the signal analyzer 220 indicates that "the sum θ(k) increases by Δθ as the value k increases by 1, and the sum θ(k)=0 when k=0", the compensator 230 may subtract the sum θ(k) of the frequency-dependent phase difference and the sampling phase difference by kΔθ to realize the sampling phase difference compensation. Effects of before and after compensation are compared as shown in FIG. 5. In FIG. 5, the vertical axis represents the sum θ(k) of the frequency-dependent phase difference and the sampling phase difference, the horizontal axis represents k, the change curve θ(k)$_{before}$ represents the phase difference sum before compensation, the dotted line l(k)$_{before}$ represents an approximate straight line of the change curve θ(k)$_{before}$ before compensation, and the change curve θ(k)$_{after}$ represents the phase difference sum after compensation. It is seen from FIG. 5 that, the change curve θ(k)$_{after}$ of the phase difference sum after compensation approximates 0 along the change in the horizontal axis. The frequency-dependent phase difference may be additionally compensated by a digital front-end circuit included in the signal generator, and associated details are generally known to one person skilled in the art. For example, an image rejection ratio (IRR) may be used to reflect the compensation effects of the compensator 230 compensating the sampling phase difference and the digital front-end circuit compensating the frequency-dependent phase difference, hence obtaining the IRR curve shown in FIG. 6. The IRR curve shown in FIG. 6 has characteristics far superior that those of the IRR curve in FIG. 1 of the prior art.

Figure 7:
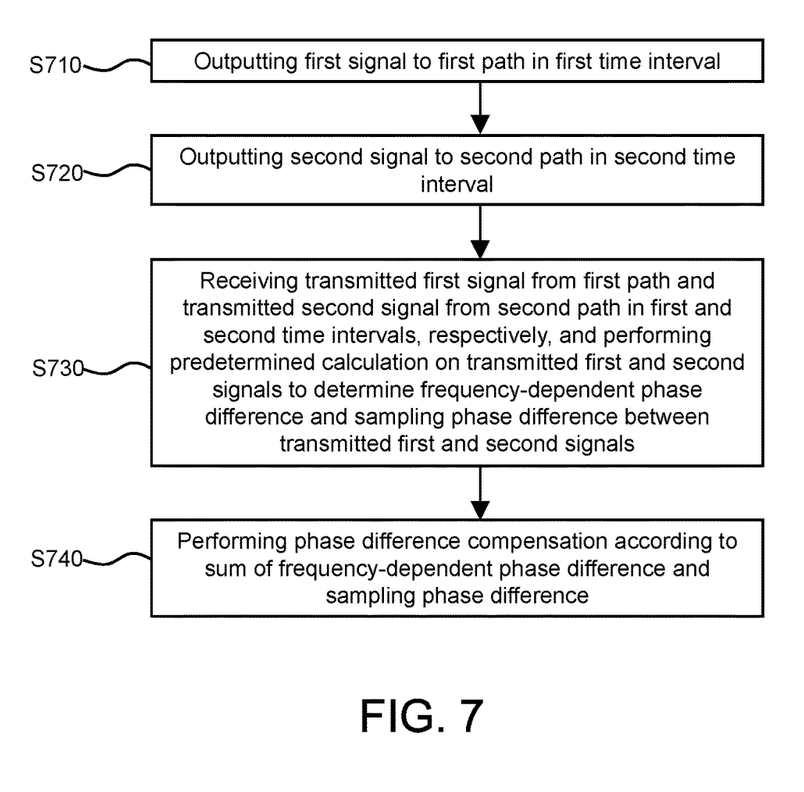
FIG. 7 is a schematic diagram of a sampling phase difference compensation method according to an embodiment of the present invention.

In addition to the above apparatus, the present invention further discloses a sampling phase difference compensation method. As shown in FIG. 7, the compensation method according to an embodiment includes following steps.

In step S710, a first signal is outputted to a first path in a first time interval. This step may be performed by a combination of the signal generator 210 and the first path 212 in FIG. 2a, or an equivalent circuit. Associated details and variations may be obtained or directly deduced from the foregoing description.

In step S720, a second signal is outputted to a second path in a second time interval. The first and second time intervals are different, and the first and second paths are different. This step may be performed by a combination of the signal generator 210 and the second path 214 in FIG. 2a. Associated details and variations may be obtained or directly deduced from the foregoing description.

In step S730, a transmitted first signal from the first path and a transmitted second signal from the second path are received in the first and second time intervals, respectively, and a predetermined calculation is performed on the transmitted first and second signals to determine a frequency-dependent phase difference and a sampling phase difference between the transmitted first and second signals. This step may be performed by the signal analyzer 220 in FIG. 2a or an equivalent circuit. Associated details and variations may be obtained or directly deduced from the foregoing description.

In step S740, the sampling phase difference compensation is performed according to a sum of the frequency-dependent phase difference and the sampling phase difference. Associated details and variations may be obtained or directly deduced from the foregoing description.

One person skilled in the art can deduce implementation details and variations according to the disclosure on the apparatus in the foregoing embodiments. More specifically, technical features of the apparatus in the foregoing embodiments may be appropriately applied in the method of the embodiment. Without affecting full disclosure and possible implementation of the method of the embodiment, repeated details are omitted herein.

Figure 8:
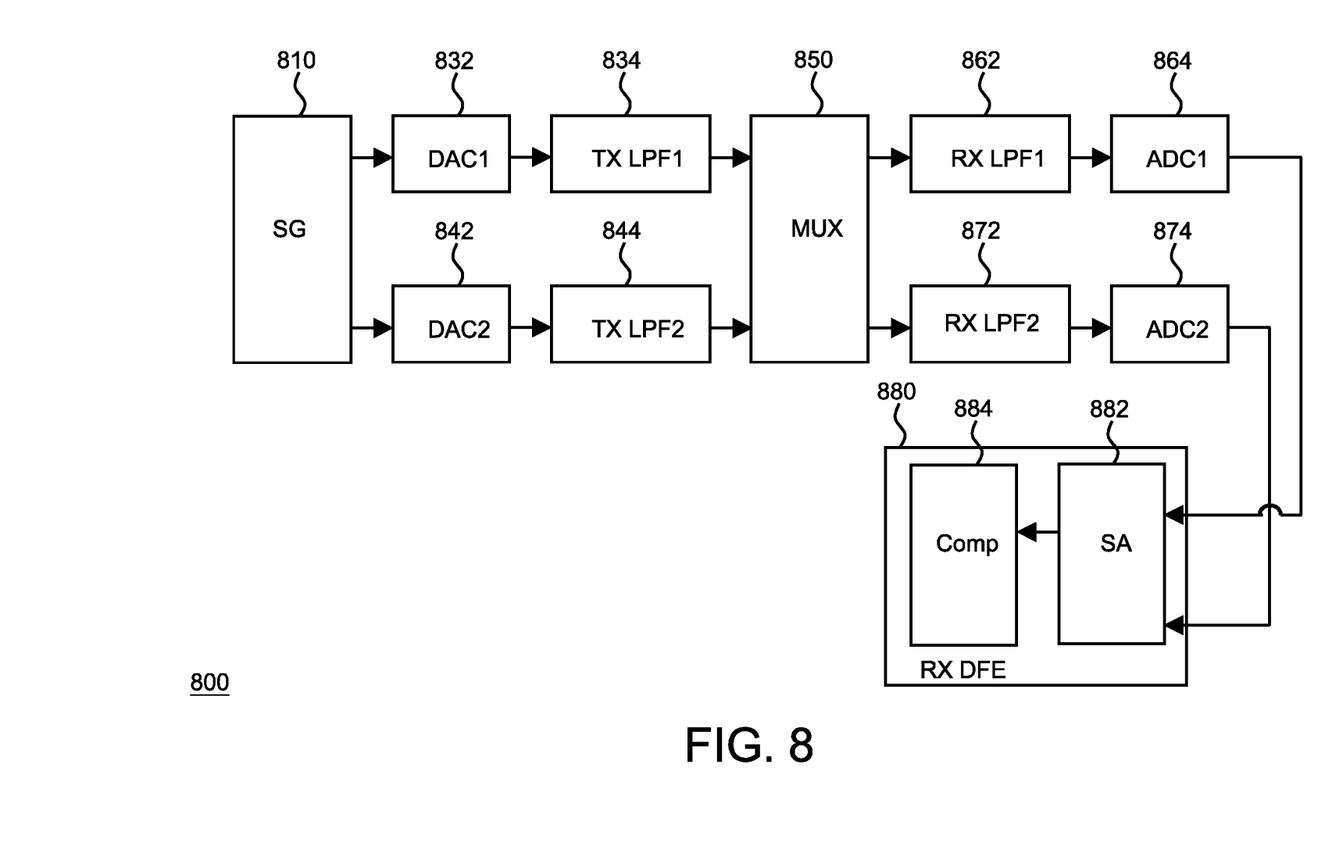
FIG. 8 is a schematic diagram of a communication device capable of compensation a sampling phase difference according to an embodiment of the present invention.

Addition to the above apparatus and method, the present invention further discloses a communication device capable of compensating a sampling phase difference. Referring to FIG. 8 showing a communication device 800 according to an embodiment, the communication device 800 includes: a signal generator (denoted as SG in the diagram) 810, a first DAC (denoted as DAC1 in the diagram) 832, a first transmission filter (denoted as TX LPF1 in the diagram) 834, a second DAC (denoted as DAC2 in the diagram) 842, a second transmission filter (denoted as TX LPF2 in the diagram) 844, a multiplexer (denoted as Mux in the diagram) 850, a first reception filter (denoted as TX LPF1 in the diagram) 862, a first ADC (denoted as ADC1 in the diagram) 864, a second reception filter (denoted as RX LPF2 in the diagram) 872, a second ADC (denoted as ADC2 in the diagram) 874, and a receiver digital front-end circuit (denoted as RX DFE in the diagram) 880. The receiver digital front-end circuit 880 includes a signal analyzer (denoted as SA in the diagram) 882 and a compensator (denoted as Comp in the diagram) 884. The signal generator 810 outputs a first signal to a first path in a first time interval, and outputs a second signal to a second path in a second time interval. The first and second time intervals are different, and the first and second paths are different. The first DAC 832, coupled to the signal generator 810, performs a digital-to-analog conversion on the first signal to generate an analog first signal. The first transmission filter 834, coupled to the first DAC 832, filters the analog first signal to generate a filtered first signal. The second DAC 842, coupled to the signal generator 810, performs a digital-to-analog conversion on the second signal to generate an analog second signal. The second transmission filter 844, coupled to the second DAC 842, filters and the analog second signal to generate a filtered second signal. The multiplexer 850, coupled to the first transmission filter 834 and the second transmission filter 844, outputs the filtered first and second signals. Time intervals of outputting the filtered first and second signals are different. The first reception filter 862, coupled to the multiplexer 850, filters the filtered first signal to generate a re-filtered first signal, and filters the filtered second signal in the second time interval to generate a re-filtered second signal. The first ADC 864, coupled to the first reception filter 862, performs an analog-to-digital conversion on the re-filtered first signal to generate a transmitted first signal, and performs the analog-to-digital conversion on the re-filtered second signal to generate a transmitted second signal. The first reception filter 872 and the second ADC 874 are not related to the inventive features of the embodiment. The signal analyzer 882, coupled to the first ADC 864, performs a predetermined calculation on the transmitted first and second signals to determine a frequency-dependent phase difference and a sampling phase difference between the transmitted first and second signals. The compensator 884 performs the sampling phase difference compensation according to the frequency-dependent phase difference and the sampling phase difference.

In conclusion, the apparatus and method of the present invention are capable of compensating the frequency-dependent phase difference and the sampling phase difference, and achieve more superior mismatch compensation results compared to known technologies.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sampling phase difference compensation apparatus, comprising:
   a signal generator, generating a first signal and a second signal, outputting the first signal to a first path in a first time interval, and outputting the second signal to a second path in a second time interval, wherein the first and second time intervals are different, and the first and second paths are different;
   a signal analyzer, receiving a transmitted first signal from the first path and a transmitted second signal from the second path, and performing a predetermined calculation on the transmitted first and second signals to determine a phase difference relationship between the transmitted first and second signals, wherein the phase difference relationship is associated with a frequency-dependent phase difference and a sampling phase difference, the transmitted first signal is associated with the first signal and the transmitted second signal is associated with the second signal; and
   a compensator, performing a sampling phase difference compensation according to the phase difference relationship.

2. The sampling phase difference compensation apparatus according to claim 1, wherein the first path comprises a first transmission path and a first reception path, and the second path comprises a second transmission path and the first reception path.

3. The sampling phase difference compensation apparatus according to claim 2, wherein the first transmission path comprises a first digital-to-analog converter (DAC), a first transmission filter and a multiplexer, the second transmission path comprises a second DAC, a second transmission filter and the multiplexer, and the first reception path comprises a first reception filter and a first analog-to-digital converter (ADC).

4. The sampling phase difference compensation apparatus according to claim 1, wherein the phase difference relationship is a change relationship of a sum of the frequency-dependent phase difference and the sampling phase difference varying with a frequency.

5. The sampling phase difference compensation apparatus according to claim 4, wherein the signal generator is adapted to control frequencies of the first and second signals, and the compensator compensates the sampling phase difference according to the change relationship.

6. The sampling phase difference compensation apparatus according to claim 4, wherein the change relationship displays a linear relationship.

7. The sampling phase difference compensation apparatus according to claim 1, wherein the predetermined calculation comprises at least one of a fast Fourier transform (FFT) calculation, a phase angle calculation, and a phase ramp estimation calculation.

8. A sampling phase difference compensation method, comprising:
   generating a first signal and a second signal;
   outputting the first signal to a first path in a first time interval;
   outputting the second signal to a second path in a second time interval, wherein the first and second time intervals are different, and the first and second paths are different;
   receiving a transmitted first signal from the first path and a transmitted second signal from the second path, and performing a predetermined calculation on the transmitted first and second signals to determine a phase difference relationship between the transmitted first and second signals, wherein the phase difference relationship is associated with a frequency-dependent phase difference and a sampling phase difference, the transmitted first signal is associated with the first signal, and the transmitted second signal is associated with the second signal; and
   performing a sampling phase difference compensation according to the phase difference relationship.

9. The sampling phase difference compensation method according to claim 8, wherein the first path comprises a first transmission path and a first reception path, and the second path comprises a second transmission path and the first reception path.

10. The sampling phase difference compensation method according to claim 9, wherein the first transmission path comprises a first digital-to-analog converter (DAC), a first transmission filter and a multiplexer, the second transmission path comprises a second DAC, a second transmission filter and the multiplexer, and the first reception path comprises a first reception filter and a first analog-to-digital converter (ADC).

11. The sampling phase difference compensation method according to claim 8, wherein the phase difference relationship is a change relationship of a sum of the frequency-dependent phase difference and the sampling phase difference varying with a frequency.

12. The sampling phase difference compensation method according to claim 11, wherein the step of performing the phase difference compensation comprises: compensating the sampling phase difference according to the change relationship.

13. The sampling phase difference compensation method according to claim 11, wherein the change relationship displays a linear relationship.

14. The sampling phase difference compensation method according to claim 8, wherein the predetermined calculation comprises at least one of a fast Fourier transform (FFT) calculation, a phase angle calculation, and a phase ramp estimation calculation.

15. A communication device capable of compensating a sampling phase difference, comprising:
   a signal generator, generating a first signal and a second signal, outputting the first signal in a first time interval, and outputting the second signal in a second time interval, wherein the first and second time intervals are different;
   a first digital-to-analog converter (DAC), coupled to the signal generator, performing a digital-to-analog conversion on the first signal to generate an analog first signal;

a first transmission filter, coupled to the first DAC, filtering the analog first signal to generate a filtered first signal;

a second DAC, coupled to the signal generator, performing the digital-to-analog conversion on the second signal to generate an analog second signal;

a second transmission filter, coupled to the second DAC, filtering the analog second signal to generate a filtered second signal;

a multiplexer, coupled to the first and second transmission filters, outputting the filtered first and second signals;

a first reception filter, coupled to the multiplexer, filtering the filtered first signal to generate a re-filtered first signal and filtering the filtered second signal to generate a re-filtered second signal;

a first analog-to-digital converter (ADC), coupled to the first reception filter, performing an analog-to-digital conversion on the re-filtered first signal to generate a transmitted first signal, and performing the analog-to-digital conversion on the re-filtered second signal to generate a transmitted second signal; and a receiver digital front-end circuit, comprising:
  a signal analyzer, coupled to the first ADC, performing a predetermined calculation on the transmitted first and second signals to determine a phase difference relationship between the transmitted first and second signals, wherein the phase difference relationship is associated with a frequency-dependent phase difference and a sampling phase difference; and
  a compensator, performing a sampling phase difference compensation according to the phase difference relationship.

16. The communication device according to claim 15, wherein the phase difference relationship is a change relationship of a sum of the frequency-dependent phase difference and the sampling phase difference varying with a frequency.

17. The communication device according to claim 16, wherein the compensator compensates the sampling phase difference according to the change relationship, and the signal generator further comprises a transmitter digital front-end circuit that compensates the frequency-dependent phase difference.

18. The communication device according to claim 16, wherein the change relationship displays a linear relationship.

19. The communication device according to claim 15, wherein the predetermined calculation comprises at least one of a fast Fourier transform (FFT) calculation, a phase angle calculation, and a phase ramp estimation calculation.

* * * * *